United States Patent
Lee et al.

(10) Patent No.: US 9,635,522 B2
(45) Date of Patent: Apr. 25, 2017

(54) METHOD FOR DETERMINING VALIDITY OF TERMINAL GROUP IDENTIFIER IN MACHINE-TO-MACHINE COMMUNICATION

(75) Inventors: Eun Jong Lee, Anyang-si (KR); Gi Won Park, Anyang-si (KR); Young Soo Yuk, Anyang-si (KR); Hee Jeong Cho, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 513 days.

(21) Appl. No.: 14/343,288

(22) PCT Filed: May 31, 2012

(86) PCT No.: PCT/KR2012/004302
§ 371 (c)(1),
(2), (4) Date: May 21, 2014

(87) PCT Pub. No.: WO2013/035970
PCT Pub. Date: Mar. 14, 2013

(65) Prior Publication Data
US 2014/0328253 A1    Nov. 6, 2014

Related U.S. Application Data

(60) Provisional application No. 61/532,573, filed on Sep. 9, 2011.

(51) Int. Cl.
*H04W 4/08*    (2009.01)
*H04W 4/00*    (2009.01)
(Continued)

(52) U.S. Cl.
CPC .............. *H04W 4/08* (2013.01); *H04L 12/18* (2013.01); *H04W 4/005* (2013.01); *H04W 8/24* (2013.01); *H04L 12/189* (2013.01); *H04W 84/00* (2013.01)

(58) Field of Classification Search
None
See application file for complete search history.

(56) References Cited

U.S. PATENT DOCUMENTS 7,349,373 B2 *   3/2008   An .................... H04W 36/18
                                                     370/331
7,835,742 B2 *  11/2010   Jaakkola ........... H04L 29/12009
                                                     370/329
(Continued)

FOREIGN PATENT DOCUMENTS

WO    WO2011082538    *  7/2011  .............. H04W 8/06

OTHER PUBLICATIONS

Kim, et al., "Multicast Operation in IEEE 802.16n," IEEE 802.16 Broadband Wireless Access Working Group, IEEE C802.16n-11/0069r1, May 2011, 9 pages.
(Continued)

*Primary Examiner* — Gregory Sefcheck
(74) *Attorney, Agent, or Firm* — Lee Hong Degerman Kang & Waimey

(57) ABSTRACT

Disclosed is a method for determining whether a machine-to-machine group identifier (MGID) for identifying a multicast service flow is supported in a wireless access system that supports machine-to-machine (M2M) communication, wherein the multicast service flow is shared by a group of M2M terminals within an M2M group zone that is allocated to the terminals. The method comprises the steps of: receiving from the first base station M2M group zone information of the first base station and neighboring base stations; receiving from the second base station system information
(Continued)

of the second base station; and determining whether the MGID that is received from the first base station is supported by the second base station by comparing the system information of the second base station and the M2M group zone information on the neighboring base stations.

10 Claims, 4 Drawing Sheets

(51) Int. Cl.
*H04W 8/24* (2009.01)
*H04L 12/18* (2006.01)
*H04W 84/00* (2009.01)

(56) References Cited

U.S. PATENT DOCUMENTS

| | | | | |
|---|---|---|---|---|
| 8,644,864 B2* | 2/2014 | Zeira | ............ | H04W 4/08 370/331 |
| 8,675,604 B2* | 3/2014 | Teyeb | ............ | H04B 7/2606 370/331 |
| 8,750,145 B2* | 6/2014 | Shaheen | ............ | H04L 63/104 370/252 |
| 8,781,480 B2* | 7/2014 | Lim | ............ | H04W 36/04 370/331 |
| 8,971,270 B2* | 3/2015 | Bachmann | ............ | H04W 4/00 370/329 |
| 9,198,137 B2* | 11/2015 | Koskela | ............ | H04W 4/005 |
| 9,246,763 B2* | 1/2016 | Forssell | ............ | H04L 41/082 |
| 9,253,178 B2* | 2/2016 | Blom | ............ | H04L 9/0833 |
| 9,307,390 B2* | 4/2016 | Lei | ............ | H04W 4/005 |
| 9,380,559 B2* | 6/2016 | Kim | ............ | H04L 12/1877 |
| 2011/0201365 A1 | 8/2011 | Segura | | |
| 2014/0169259 A1* | 6/2014 | Lee | ............ | H04L 12/189 370/312 |

OTHER PUBLICATIONS

Kim, et al., "Multicast Operation over WirelessMAN HR-OFDMA air interface," IEEE 802.16 Broadband Wireless Access Working Group, IEEE C802.16n-11/0121, Jul. 2011, 18 pages (relevant pages: pp. 10-18).

Kim, et al., "Reliability of paging message with multicast indication," IEEE 802.16 Broadband Wireless Access Working Group, IEEE 802.16p-11/0117r1, May 2011, 6 pages.

Kim, et al., "Reliable multicast data transmission," IEEE 802.16 Broadband Wireless Access Working Group, IEEE 802.16p-11/0173, Jul. 2011, 9 pages.

* cited by examiner

METHOD FOR DETERMINING VALIDITY OF TERMINAL GROUP IDENTIFIER IN MACHINE-TO-MACHINE COMMUNICATION

CROSS-REFERENCE TO RELATED APPLICATIONS

This application is the National Stage filing under 35 U.S.C. 371 of International Application No. PCT/KR2012/004302, filed on May 31, 2012, which claims the benefit of U.S. Provisional Application Ser. No. 61/532,573, filed on Sep. 9, 2011, the contents of which are all hereby incorporated by reference herein in their entirety.

BACKGROUND OF THE INVENTION

Field of the Invention

The present invention relates to a method for determining availability of an assigned machine to machine (M2M) group identifier by a machine to machine (M2M) terminal, and more particularly, to a method for determining whether to support a preassigned M2M group identifier based on a change of an M2M group zone identifier.

Related Art

Machine to machine (M2M) communication (machine type communication: MTC)

Hereinafter, a machine to machine (M2M) communication (machine type communication: MTC) will be described in brief.

The M2M communication means communication between electronic devices as a crude representation. That is, the M2M communication means communication between objects. In general, the M2M communication means wired or wireless communication between the electronic devices or communication between a device and a machine controlled by human, but the M2M communication is used as a meaning that particularly designates wireless communication between the electronic devices, that is, machines. Further, M2M terminals used in a cellular network have lower performance or capability than general terminals.

A lot of terminals are present in a cell and the terminals may be distinguished from each other according to a type, a class, a service type, and the like of the terminal.

As one example, the terminals may be classified into terminals for human type communication (HTC) and a machine type communication (MTC) according to operation types of the terminals. The MTC may include communication between the M2M terminals. Herein, the HTC means transmitting and receiving a signal by determination of signal transmission by human, and the MTC means that each terminal transmits a signal by even occurrence or periodically of itself without intervention by human.

In addition, when the M2M communication or the machine type communication (MTC) is considered, the number of all terminals may be rapidly increased. The M2M communication may have features described below depending on a service that supports the M2M terminals.

1. A lot of terminals in the cell
2. Small data amount
3. Low transmission frequency (may have periodicity)
4. Data characteristic of a limited number
5. Not sensitive to time delay
6. Low mobility or fixed Further, the M2M communication may be used in various fields including a protection access and monitoring, tracking and discovering, public safety (an emergency situation and a disaster), payment (a vending machine, a ticket machine, and a parking meter), health care, remote control, a smart meter, and the like.

Idle Mode

An idle mode is a mechanism in which although a terminal wanders about a radio link environment where a plurality of base stations is present throughout a wide area, the terminal is capable of periodically receiving a downlink broadcast message without registration in a specific base station.

The idle mode represents a state in which all normal operations as well as handover (HO) stops and only downlink synchronization is adjusted so as to receive a paging message which is a broadcast message in only a predetermined interval. The paging message is a message that instructs the terminal to perform a paging action. For example, the paging action includes ranging execution, network reentry, and the like.

The idle mode may be started by the terminal or the base station. That is, the terminal transmits a deregistration request (DREG-REQ) message to the base station and receives a deregistration response (DREG-RSP) message from the base station in response thereto to enter the idle mode. Further, the base station transmits an unrequested deregistration response (DREG-RSP) message or a deregistration command (DREG-CMD) message to enter the idle mode.

In the idle mode, when the terminal receives the paging message corresponding thereto during an available interval (AI), the terminal transmits and receives data to and from the base station by switching the idle mode to a connected mode through a network entry process.

SUMMARY OF THE INVENTION

In the related art, a method for the terminal or the base station to recognize a change of an M2M group zone which may occur by mobility of the terminal is not clearly defined. Accordingly, the present invention proposes a method for the terminal or the base station to recognize the change of the M2M group zone.

In accordance with an aspect of the present invention, there is provided a method in which a terminal supports a machine to machine (M2M) group identifier (MGID) identifying a multicast service flow shared by a group of M2M terminals in an assigned M2M group zone, in a wireless access system that supports machine to machine communication (M2M), including the steps of: receiving an MGID and M2M group zone information to which the MGID is supported, from a first base station; receiving M2M group zone information of the first base station and neighboring base stations from the first base station; receiving, from a second base station, system information of the second base station from the second base station; and judging whether the MGID received by the first base station is supported in the second base station by comparing the system information of the second base station and the M2M group zone information of the neighboring base stations.

In the embodiment, in the receiving of the M2M group zone information of the first base station and the neighboring base stations from the first base station, the M2M group zone information of the first base station and the neighboring base stations may be received through an NBR-ADV message transmitted from the first base station.

Further, in the embodiment, the M2M group zone information may be an M2M group zone ID.

In addition, in the embodiment, when the M2M group zone information of the neighboring base stations does not include M2M group zone information regarding the second base station, the method may further include: transmitting a location updating request message to the second base station, the location updating request message including the MGID received from the first base station and the M2M group zone information of the first base station; and receiving a location updating response message from the second base station, wherein the location updating response message may include an updated MGID and M2M group zone information to which the updated MGID is supported.

Besides, in the embodiment, the location updating request message may further include a field to request M2M group zone information regarding neighboring base stations of the second base station, and the location updating response message may further include a field number to which the M2M group zone information regarding the neighboring base stations of the second base station is transmitted.

Moreover, in the embodiment, the location updating request message may further include a field to request M2M group zone information regarding the neighboring base stations of the second base station, and the M2M group zone information regarding the neighboring base stations of the second base station may be transmitted through the NBR-ADV message during a listening interval of the terminal.

In addition, in the embodiment, the location updating request message may be a ranging request (RNG-REQ) message, and the location updating response message may be a ranging response (RNG-RSP) message.

Further, in the embodiment, M2M group zones to which a first base station or a second base station belongs may be one or more. In addition, in the embodiment, when the M2M group zones to which the first base station or the second base station belongs are one or more, all MGIDs assigned by the terminal may be supported in only any one M2M group zone.

Besides, in the embodiment, the M2M group zones to which the first base station or the second base station belongs may include one or more base stations.

Meanwhile, in accordance with another aspect of the present invention, there is provided a terminal that supports machine to machine (M2M) communication, including: a transceiving unit for transmitting/receiving a radio signal to/from the outside; and a control unit connected with a wireless communication unit, wherein the control unit controls the transceiving unit to receive an MGID and M2M group zone information to which the MGID is supported, from a first base station, controls the transceiving unit to receive the M2M group zone information of the first base station and neighboring base stations from the first base station, controls the transceiving unit to receive, from a second base station, system information of the second base station, and judges whether the MGID received by the first base station is supported in the second base station by comparing the system information of the second base station and the M2M group zone information of the neighboring base stations.

In the embodiment, the control unit may control the transceiving unit to receive the M2M group zone information of the first base station and the neighboring base stations through an NBR-ADV message transmitted from the first base station.

Further, in the embodiment, when the M2M group zone information of the neighboring base stations does not include M2M group zone information regarding the second base station, the control unit may control the transceiving unit to transmit a location updating request message including the MGID and the M2M group zone information of the first base station received from the first base station to the second base station, and control the transceiving unit to receive a location updating response message including an updated MGID and M2M group zone information to which the updated MGID is supported from the second base station.

Moreover, in the embodiment, the location updating request message may further include a field to request M2M group zone information regarding neighboring base stations of the second base station, and the control unit may control the transceiving unit to receive the M2M group zone information regarding the neighboring base stations of the second base station through the NBR-ADV message during a listening interval.

According to embodiments of the present invention, an M2M terminal of a wideband wireless communication system recognizes an M2M group zone so as to efficiently update an MGID.

DESCRIPTION OF EXEMPLARY EMBODIMENTS

Figure 1:
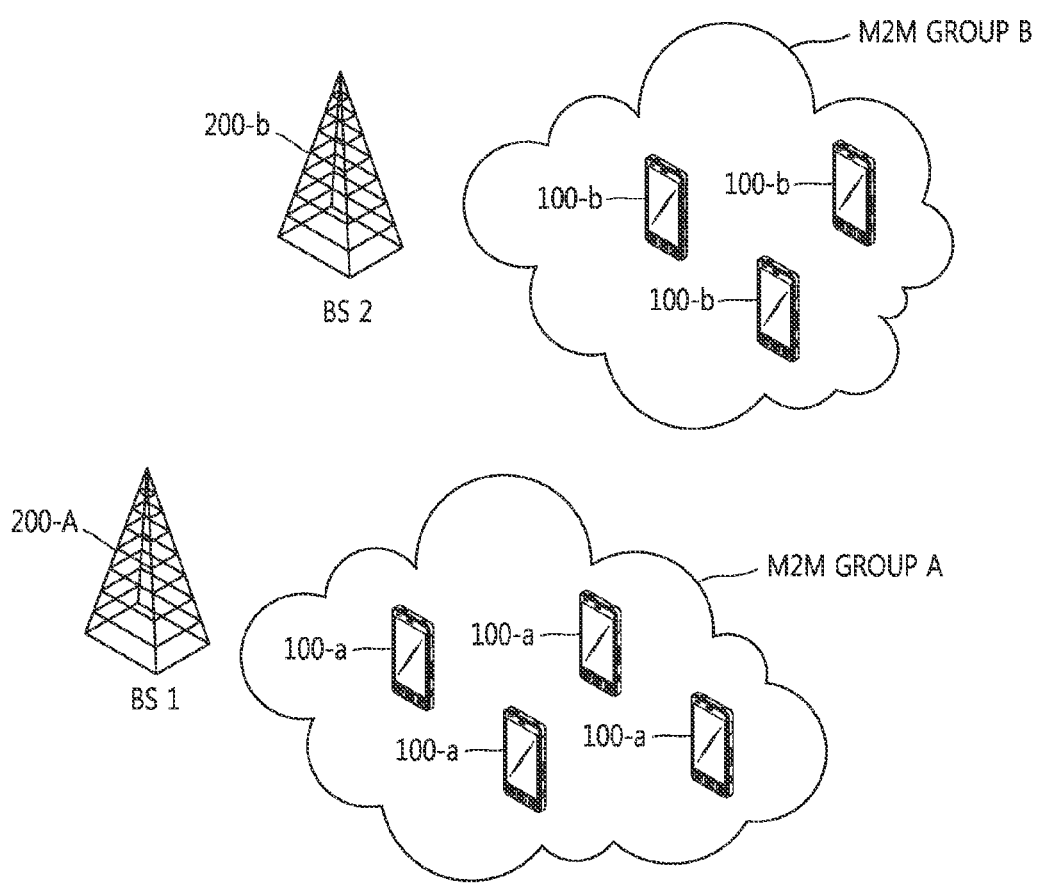
FIG. 1 is a conceptual diagram illustrating a wireless access network according to an embodiment of the present invention.

Technology to be described below may be applied to various wireless communication systems such as code division multiple access (CDMA), frequency division multiple access (FDMA), time division multiple access (TDMA), orthogonal frequency division multiple access (OFDMA), single carrier-FDMA (SC-FDMA), and the like. The CDMA may be implemented by a radio technology such as universal terrestrial radio access (UTRA) or CDMA2000. The UTRA is a part of a universal mobile telecommunication system (UMTS). 3rd generation partnership project (3GPP) long term evolution (LTE) as a part of an evolved UMTS (E-UMTS) using evolved-UMTS terrestrial radio access (E-UTRA) adopts the OFDMA in a downlink and the SC-FDMA in an uplink. LTE-advanced (A) is an evolution of the 3GPP LTE.

The TDMA may be implemented by a radio technology such as global system for mobile communications (GSM)/ general packet radio service (GPRS)/enhanced data rates for GSM evolution (EDGE). The OFDMA may be implemented by a radio technology such as IEEE 802.11 (Wi-Fi), IEEE 802.16 (WiMAX), IEEE 802.20-20, or E-UTR A (Evolved UTRA). The IEEE 802.16m as an evolution of IEEE 802.16e provides backward compatibility to a system based on the IEEE 802.16e. Further, the 802.16p provides a communication standard for supporting machine type communication (MTC).

It is noted that Technical terms used in the specification are used to just describe a specific embodiment and do not intend to limit the present invention. Further, if the technical terms used in the specification are not particularly defined as other meanings in the specification, the technical terms should be appreciated as meanings generally appreciated by those skilled in the art and should not be appreciated as excessively comprehensive meanings or excessively reduced meanings. Further, when the technical term used in the specification is a wrong technical term that cannot accurately express the spirit of the present invention, the technical term is substituted by a technical term which can correctly appreciated by those skilled in the art to be appreciated. In addition, a general term used in the present invention should be analyzed as defined in a dictionary or according to front and back contexts and should not be analyzed as an excessively reduced meaning.

Moreover, if singular expression used in the specification is not apparently different on a context, the singular expression includes a plural expression. Further, in the present invention, it should not analyzed that a term such as "comprising" or "including" particularly includes various components or various steps disclosed in the specification and some component or some steps among them may not included or additional components or steps may be further included.

In addition, terms including ordinal numbers, such as 'first', 'second', etc. can be used to describe various components, but the components should not be limited by the terms. The above terminologies are used only to discriminate one component from the other component. For example, a first component may be named as a second component and similarly, the second component may also be named as the first component.

It should be understood that, when it is described that an element is "coupled" or "connected" to another element, the element may be "directly coupled" or "directly connected" to the another element or "coupled" or "connected" to the another element through a third element. In contrast, it should be understood that, when it is described that an element is "directly coupled" or "directly connected" to another element, it is understood that no element is not present between the element and the another element.

Hereinafter, exemplary embodiments of the present invention will be described in detail with reference to the accompanying drawings, in which like or similar reference numerals refer to like elements regardless of reference numerals and a duplicated description thereof will be omitted. In describing the present invention, when it is determined that the detailed description of the known art related to the present invention may obscure the gist of the present invention, the detailed description thereof will be omitted. Further, it is noted that the accompanying drawings are used just for easily appreciating the spirit of the present invention and it should not be analyzed that the spirit of the present invention is limited by the accompanying drawings. It should be analyzed that the spirit of the present invention is extended up to all changes, equivalents, or substitutions in addition to the accompanying drawings.

Hereinafter, embodiments of the present invention will be described based on an IEEE 802.16 standard for clarity, but the technical spirit of the present invention disclosed in the specification is not limited thereto.

FIG. 1—Network Concept

FIG. 1 is a conceptual diagram illustrating a wireless access network according to an embodiment of the present invention.

Referring to FIG. 1, the wireless access network includes a terminal 100 and base stations 200a and 200b. The terminals 100 and 110 may be fixed or movable and may be called other terms such as user equipment (UE), a user terminal (UT), a subscriber station (SS), a wireless device, an advanced mobile station (AMS), and the like. Further, the terminals 100 and 110 include a concept of an MTC or M2M terminal.

The base stations 200a and 200b represents a fixed station that communicates with the terminals 100 and 110, and may be called other terms such as a NodeB, a base transceiver system (BTS), an access point, and the like. One or more cells may be present in one base station 200a or 200b.

Hereinafter, embodiments of the present invention will be described based on an IEEE 802.16 standard for clarity, but the technical spirit of the present invention disclosed in the specification is not limited thereto.

The M2M terminal according to the embodiment of the present invention may belong to one or more M2M groups. The M2M group is a group of M2M terminals that share one or more features. For example, the M2M group may be a set of terminals that receive a specific application service. Each M2M group is assigned with an M2M group ID (MGID) and the MGID is used to uniquely identify a specific M2M group in a network entity. Herein, the network entity may be, for example, an M2M server.

The M2M group identifier (MGID) may be assigned by the network entity and assigned to a service flow of the M2M terminal through a DSA process after entering an initial network. Alternatively, the MGID may be assigned through other processes. The assigned MGID is maintained in the M2M terminal if the terminal escapes from the network or the network does not delete the service flow associated with the MGID. The MGID may be changed through a dynamic service change (DSC) process.

An M2M group zone identifier or a network entity identifier is an identifier that identifies the network entity that assigns the MGID. One M2M group zone may include one or more base stations and one base station may belong to one or more M2M group zones. A mapping relationship of the service flow and the MGID may be the same in one M2M group zone and mapping relationships of the service flows and the MGIDs in different M2M group zones may be different from each other. The base station may transmit an ID of an M2M group zone to which the base station belongs to terminals through a broadcast message (for example, an AAI-SCD message).

Figure 2:
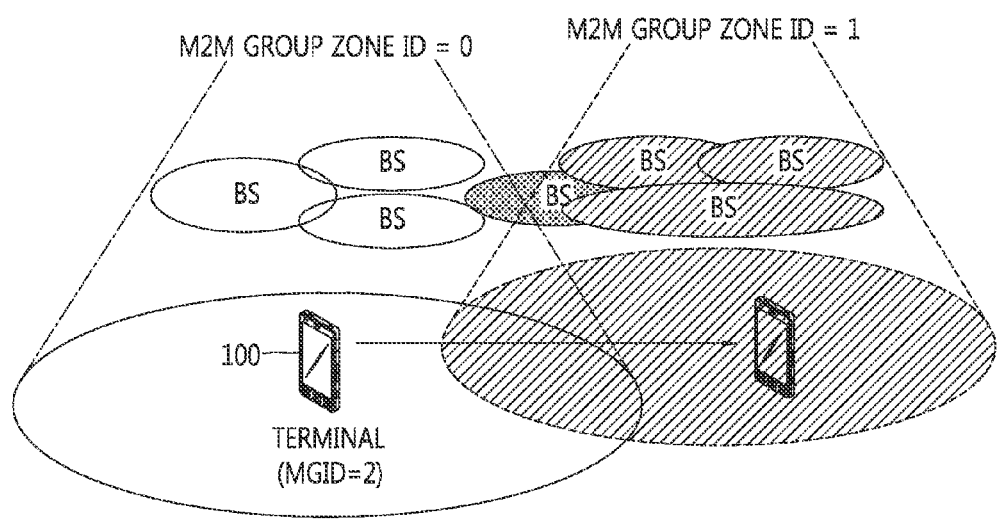
FIG. 2 is a diagram illustrating a situation in which an M2M terminal needs to update an M2M group identifier (MGID).

FIG. 2—Updating M2M Group Identifier (MGID) of M2M Terminal

FIG. 2 is a diagram illustrating a situation in which an M2M terminal needs to update an M2M group identifier (MGID).

As described in FIG. 1, each base station may belong to a specific M2M group zone. Each base station illustrated in FIG. 2 belongs to an M2M group zone of which an ID is 0 or an M2M group zone of which an ID is 1.

Assumed that the M2M terminal moves from the M2M group zone of which the ID is 0 to the M2M group zone of which the ID is 1, the MGID supported in each M2M group zone may be changed in this case.

If the MGID supported in the M2M group zone is changed, that is, if the M2M terminal assigned with the MGID escapes from an M2M group zone in which the corresponding MGID is available, the terminal and the network needs to recognize the MGID and update the MGID to an MGID suitable for the changed M2M group zone.

As illustrated in FIG. 2, an MGID for a specific service flow (for example, traffic information and map information) is assigned with 2 in the M2M group zone of which the ID is 0, but an MGID for the same service flow may be assigned with 3 in the M2M group zone of which the ID is 0. In this case, the terminal may accurately receive data when the terminal needs to update the MGID.

In a current IEEE 802.16p standard, a method for the terminal or the base station to recognize a change of an M2M group zone which may occur by mobility of the terminal is not clearly defined. Further, even a procedure of updating the MGID by the change of the M2M group zone is not clearly defined.

Accordingly, if the terminal or the base station recognizes the change of the M2M group zone to use the procedure defined in the related art in order to update the MGID, (1) In the case of a terminal in a connected mode, when the terminal in the connected mode moves between the base stations, the terminal in the connected mode performs a handover procedure, and as a result, the terminal in the connected node may update the MGID during a handover process or a subsequent network reentry process. Alternatively, the terminal may update the MGID through a dynamic service change (DSC) procedure. Meanwhile, (2) since a terminal in an idle mode needs to receive a group paging message by using the MGID, the terminal needs to update the MGID when the terminal escapes from the existing M2M group zone. In this case, a location updating process (including group location updating through the paging message, timer based updating, and the like) or a network reentry process may be used. However, in the related art, since the location updating of the terminal in the idle mode is performed based on a paging group, a method to recognize the change of the M2M group zone needs to be further defined.

Although already mentioned, in two cases described above, the method to recognize the change of the M2M group zone and the MGID updating process are not clearly defined in the standard in the related art.

In order to improve the problem in the related art, the present invention provides a method in which the terminal receives an M2M group zone ID of the base station, which is transmitted through an NBR-ADV message is proposed as an embodiment. Further, a method for judging whether the assigned MGID is supported based on the received M2M group zone ID.

In the related art, the terminal in the idle mode need not receive the NBR-ADV message. The reason is that the terminal in the idle mode operates to just receive the paging message and the terminal that moves to a neighboring base station receives an SFH of the corresponding base station to receive paging associated information. Moreover, since the NBR-ADV message is transmitted with a long period, it is difficult to synchronize the long transmission period with a listening interval of the terminal in the idle mode. Therefore, in the related art, the NBR-ADV message does not contain information required for the terminal in the idle mode and the terminal generally receives required information through the SFH.

Due to such a reason, when the base station transmits the ID of the M2M group zone to which the corresponding base station belongs through the NBR-ADV message, a method in which the terminal in the idle mode may rapidly judge whether to change the M2M group zone ID is requested. Further, (when necessary), a method of updating M2M group zone information of the neighboring base station needs to be defined.

In an embodiment of the present invention, when the M2M terminal in the idle mode enters a zone of the base station which is not present in the NBR-ADV message which the M2M terminal receives last, the M2M terminal in the idle mode verifies whether the MGID is available by performing the location updating. Moreover, the M2M terminal in the idle mode requests a second base station to transmit the NBR-ADV message.

Hereinafter, the embodiment of the present invention will be described in detail.

Figure 3:
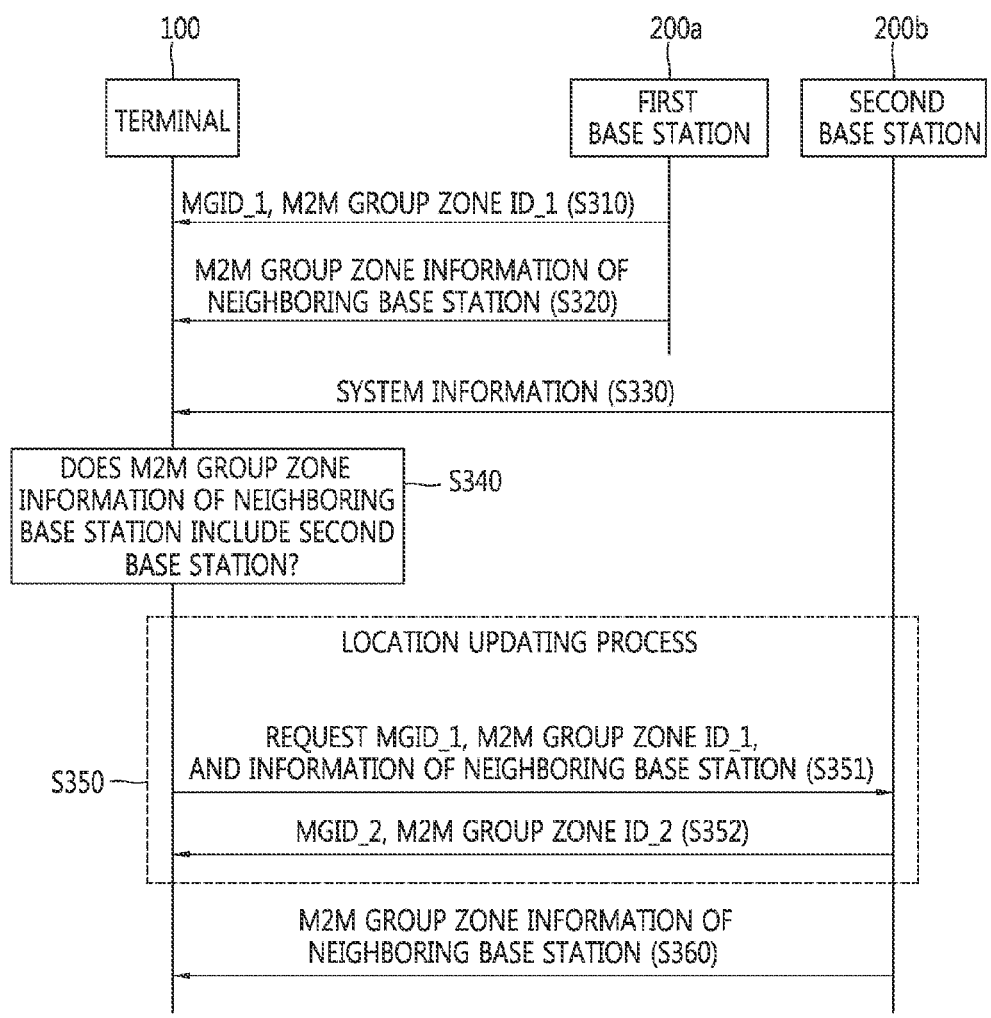
FIG. 3 is a flowchart illustrating an MGID update procedure according to an embodiment of the present invention.

FIG. 3—Procedure of Judging Availability of MGID

FIG. 3 is a flowchart illustrating an MGID availability judging procedure according to an embodiment of the present invention.

In the embodiment, it is assumed that the first base station is included in the M2M group zone of which the ID is 1 and the second base station is included in the M2M group zone of which the ID is 2. Further, it is assumed that MGIDs for the specific service flow in the respective M2M group zones may be different from each other.

The availability of the MGID means whether an MGID which the terminal is assigned with from a predetermined base station is supported even in another base station.

The terminal 100 receives an MGID and M2M group zone information (for example, an M2M group zone identifier (ID) or an M2M network entity ID) to which the MGID is supported, from the first base station 200a (S310). In this case, mapping information between the MGID and the M2M group zone ID may also be received. For example, the terminal may receive a pair of the MGID and the M2M group zone ID.

The terminal 100 may receive both the MGID and the M2M group zone ID information of the first base station through a specific procedure (for example, a DSA procedure) or receive each of the MGID and the M2M group zone ID information through separate procedures, respectively. For example, the terminal 100 may receive the M2M group zone ID information of the first base station and M2M group zone ID information of neighboring base stations through a broadcast message such as a neighbor advertisement (NBR-ADV) message, and the like.

A structure o the NBR-ADV message proposed by the present invention will be described in Table 1 below.

TABLE 1

| For (i=0; i<N-NBR-ABSs; i++){ |
| --- |
| BSID |
| MAC protocol version |
| CP time |
| ...... |
| M2M network entity ID |
| ...... |
| } |

Herein, the M2M network entity ID means the M2M group zone ID.

The terminal in the connected mode receives the NBR-ADV message before the handover to know the M2M group zone ID of the neighboring base station and know whether an M2M group zone of a target base station is changed in advance.

The terminal in the idle mode receives the NBR-ADV message to know the M2M group zone IDs of the neighboring base stations and when the terminal in the idle mode moves to a zone of a base station in which the M2Mm group zone ID is changed, the terminal in the idle mode may perform an appropriate operation (for example, group paging receiving and MGID updating) by the change of the M2M group zone ID.

The terminal 100 stores the received MGID and M2M group zone information of the first base station and the neighboring base stations.

Thereafter, the terminal escapes from a service zone of the first base station 200a to enter a service zone of the second base station 200b due to location movement, and the like. The terminal 100 receives system information of the second base station 200b and starts a procedure of judging the availability of the MGID assigned from the first base station 200a.

First, the terminal 100 judges whether the M2M group zone information of the second base station 200b is included in the M2M group zone information of the neighboring base stations which is received in advance. In this case, the terminal 100 may judge whether the M2M group zone information of the second base station 200b is included in the M2M group zone information of the neighboring base stations based on the system information (for example, a base station identifier (BSID)) of the second base station 200b received from the second base station 200b.

When the terminal 100 may know the M2M group zone information of the second base station 200b based on the M2M group zone information of the neighboring base stations which is received in advance, the terminal 100 compares the assigned MGID and M2M group zone ID and the M2M group zone ID of the second base station 200b to judge the availability of the MGID.

For example, when the M2M group zone ID is not changed, a related service is used by continuously the preassigned MGID and when the M2M group zone ID is changed, the MGID updating procedure is performed.

However, when the terminal 100 may not know the M2M group zone information of the second base station 200b based on the M2M group zone information of the neighboring base stations which is received in advance (for example, when the NBR-ADV message received from the first base station does not include the information on the second base station 200b), the terminal 100 needs to acquire the M2M group zone information of the second base station 200b. Furthermore, the availability of the preassigned MGID needs to be verified.

To this end, it may be verified whether the MGID is available through the location updating procedure (S350). Moreover, the terminal 100 may request the M2M group zone information of the neighboring base stations to the second base station 200b (S351).

The location updating procedure and the request procedure of the M2M group zone information in the embodiment may be performed as described below.

The terminal 100 transmits a location updating request message (for example, a ranging request (RNG-REQ) message) to the second base station 200b (S351). In this case, the terminal 100 may set an action code in the location updating request message as a value (for example, 0b0011) indicating the location updating. Further, a field (or parameter) to request the M2M group zone ID and the information on the neighboring base station received from the first base station 200a is added to the location updating request message to be transmitted.

The second base station that receives the location updating request (action code=location update) message compares the M2M group zone ID to which the second base station 200b belongs and the M2M group zone ID of the first base station 200a included in the message. As the comparison result, when the MGID of the terminal 100 needs to be updated, the second base station 200b adds an updated MGID (that is, the MGID supported in the second base station for the service flow mapped with the existing MGID) and M2M group zone information to which the updated MGID is supported to a location updating response message (for example, a ranging-response (RNG-RSP) message) to transmit the MGID and the M2M group zone information added to the location updating response message (S352). Further, the terminal 100 further adds the M2M group zone ID of the second base station 200b to transmit the MGID and the M2M group zone information further including the M2M group zone ID. In this case, the second base station 200b further adds a frame number to which the M2M group zone information (alternatively, the NBR-ADV message including the M2M group zone information of the neighboring base stations) of the neighboring base stations to the location updating response message to transmit the location updating response message further including the frame number. Alternatively, the second base station 200b may transmit the message (for example, the NBR-ADV message) including the M2M group zone information of the neighboring base stations in a unicast method after transmitting the location updating response message. In this case, the NBR-ADV message may be transmitted within a listening interval of the terminal 100.

The terminal 100 that receives the location updating response message from the second base station 200b further receives the M2M group zone information of the neighboring base stations (S360). Thereafter, the terminal 100 enters an unavailable interval.

The M2M terminal in the idle mode may update the M2M group zone information of the neighboring base stations through the aforementioned process and when necessary, the MGID may be updated.

In order to perform the aforementioned process, a location updating trigger condition for the M2M terminal may be added. That is, an 'M2M group zone based location update' condition is added. In other words, when the terminal may not know the availability of the current assigned MGID (for example, when the terminal moves to a base station zone that may not know the M2M group zone information), the terminal performs a location updating process and the base station reassigns a new MGID to the terminal during (after) the location updating process.

FIG. 4—Device

Figure 4:
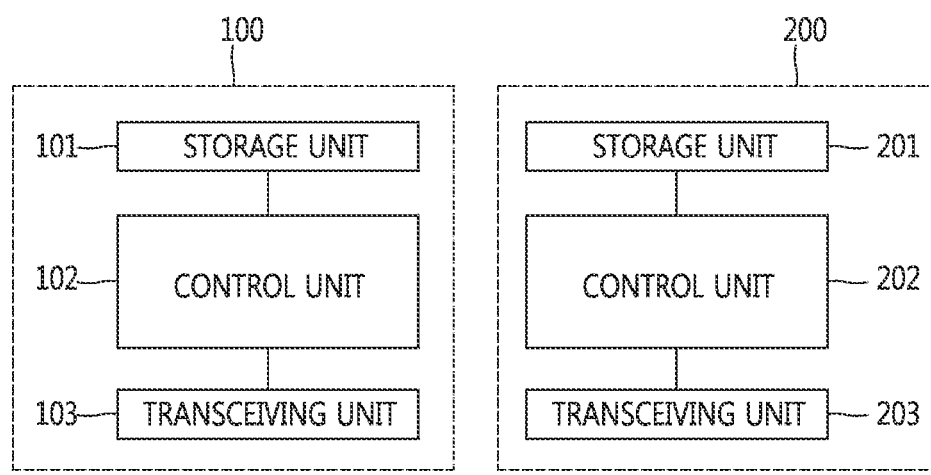
FIG. 4 is a configuration block diagram of an M2M terminal and a base station according to embodiments of the present invention.

FIG. 4 is a configuration block diagram of an M2M terminal and a base station according to embodiments of the present invention.

As illustrated in FIG. 4, the M2M terminal 100 is configured to include a storage unit (memory) 101, a control unit (processor) 102, and a transceiving unit (radio frequency (RF) unit) 103. Further, the terminal 100 includes a display unit, a user interface unit, and the like.

The control unit 102 implements a function, a process, and/or a method which are proposed. Layers of a wireless interface protocol may be implemented by the control unit 102.

The storage unit 101 is connected with the control unit 102 to store a protocol or a parameter for performing wireless communication. That is, the storage unit 101 stores a terminal driving system, an application, and a general file.

The transceiving unit 103 is connected with the control unit 102 to transmit and/or receive a radio signal.

Additionally, the display unit may display various pieces of information of the terminal and adopt well-known elements such as a liquid crystal display (LCD), an organic light emitting diode (OLED), and the like. The user interface unit may be constituted by a combination of well-known user interfaces such as a keypad or a touch screen.

A base station 200 includes a control unit (processor) 202, a storage unit (memory) 201, and a transceiving unit (radio frequency (RF) unit) 203.

The control unit 202 implements a function, a process, and/or a method which are proposed. The layers of the wireless interface protocol may be implemented by the control unit 202.

The storage unit 201 is connected with the control unit 202 to store a protocol or a parameter for performing wireless communication.

The transceiving unit 203 is connected with the control unit 202 to transmit and/or receive the radio signal.

The control units 102 and 202 may include an application-specific integrated circuit (ASIC), another chip set, a logic circuit and/or a data processing apparatus as a processor. The memory 101,201 may include a read-only memory (ROM), a random access memory (RAM), a flash memory, a memory card, a storage medium, and/or another storage device. The transceiving units 103 and 203 may include a baseband circuit for processing the radio signal. When the embodiment is implemented by software, the aforementioned method may be implemented by a module (process, function, and the like) performing the aforementioned function. The module may be stored in the storage units 101 and 201 and executed by the control units 102 and 202.

The storage units 101 and 201 may be provided inside or outside the control units 102 and 202 and connected with the control units 102 and 202 by various well-known means.

The aforementioned embodiments are acquired by combining the components and features of the present invention in a predetermined format. It should be considered that each component or feature is selective if not additionally clearly mentioned. Each component or feature may be implemented while being not combined with other components or features. Further, some components and/or features are combined to configure the embodiment of the present invention. A sequence of the operations described in the embodiments of the present invention may be changed. Some components or features of any embodiment may be included in another embodiment or replaced with corresponding components or features of another embodiment. The present invention may be implemented in another specific form within the scope without departing from the spirit and essential feature of the present invention. Therefore, the detailed description should not limitatively be analyzed in all aspects and should be exemplarily considered. The scope of the present invention should be determined by rational interpretation of the appended claims and all changes are included in the scope of the present invention within the equivalent scope of the present invention. Further, claims having no clear quoting relation in the claims are combined to configure the embodiment or may be included as new claims by correction after application.

What is claimed is:

1. A method for machine to machine (M2M) communication comprising a plurality of M2M zones, each comprising a plurality of M2M groups, the method performed by a user equipment (UE) and comprising:
   receiving first M2M group zone (MGZ) information including a first M2M group identifier (MGID) corresponding to a first M2M group and a first M2M group zone identifier (MGZID) corresponding to a first M2M zone from a first base station (BS);
   receiving neighbor group zone (NGZ) information including a neighbor MGZID corresponding to a neighbor zone from the first BS;
   when moving from the first M2M zone to a second M2M zone, receiving second MGZ information including a second MGZID corresponding to the second M2M zone from a second BS;
   determining whether the second MGZID is included in the NGZ information;
   if the second MGZID is not included in the NGZ information, transmitting a location updating request message including the first MGID and the first MGZID for updating the first MGZ information to the second BS; and
   receiving a location updating response message including the updated first MGID and the updated first MGZID from the second BS.

2. The method of claim 1, wherein the first MGZ information and the NGZ information are received simultaneously through the broadcast message transmitted from the first BS, and wherein the broadcast message is a neighbor advertisement (NBR-ADV) message.

3. The method of claim 1, wherein the UE operates as an idle mode, and wherein the idle mode indicates a state in which downlink synchronization is adjusted so as to receive a broadcast message based on the first MGID.

4. The method of claim 1, wherein:
   the location updating request message further includes a field to request M2M group zone information regarding neighboring base stations of the second BS, and
   the location updating response message further includes a frame number to which the M2M group zone information regarding the neighboring base stations of the second BS is transmitted.

5. The method of claim 1, wherein:
   the location updating request message further includes a field to request M2M group zone information regarding the neighboring base stations of the second BS, and
   the M2M group zone information regarding the neighboring base stations of the second BS is transmitted through a NBR-ADV message during a listening interval of the UE.

6. The method of claim 1, wherein:
   the location updating request message is a ranging request (RNG-REQ) message, and
   the location updating response message is a ranging response (RNG-RSP) message.

7. The method of claim 1, wherein the second M2M zone includes a plurality of second M2M groups.

8. The method of claim 1, further comprising:
   if the second MGZID is included in the NGZ information, performing a MGID updating procedure based on the NGZ information.

9. A user equipment (UE) for machine to machine (M2M) communication comprising a plurality of M2M zones, each comprising a plurality of M2M groups, the UE comprising:
   a radio frequency (RF) unit transmitting or receiving a radio signal; and
   a processor operatively coupled to the RF unit, wherein the processor is configured for:
   controlling the RF unit to receive first M2M group zone (MGZ) information including a first M2M group identifier (MGID) corresponding to a first M2M group and a first M2M group zone identifier (MGZID) corresponding to a first M2M zone from a first base station (BS),
   receive neighbor group zone (NGZ) information including a neighbor MGZID corresponding to a neighbor zone from the first BS, when moving from the first M2M zone to a second M2M zone, receive second MGZ information including a second MGZID corresponding to the second M2M zone from a second BS, determine whether the second MGZID is included in the NGZ information, and if the second MGZID is not included in the NGZ information, transmit a location updating request message including the first MGID and the first MGZID for updating the first MGZ information to the second BS, receive a location updating response message including the updated first MGID and the updated first MGZID from the second BS.

10. The UE of claim 9, wherein the first MGZ information and the NGZ information are received simultaneously through an NBR-ADV message transmitted from the first base station.

* * * * *